United States Patent [19]

Shibata et al.

[11] Patent Number: 4,799,466
[45] Date of Patent: Jan. 24, 1989

[54] DECELERATION CONTROL DEVICE OF AN INTERNAL COMBUSTION ENGINE

[75] Inventors: Yoshiaki Shibata; Hidemi Ohnaka, both of Susono, Japan

[73] Assignee: Toyota Jidosha Kabushiki Kaisha, Toyota, Japan

[21] Appl. No.: 73,316

[22] Filed: Jul. 9, 1987

Related U.S. Application Data

[63] Continuation of Ser. No. 800,347, Nov. 21, 1985, abandoned.

[30] Foreign Application Priority Data

Nov. 29, 1984 [JP] Japan .................. 59-250396
Nov. 29, 1984 [JP] Japan .................. 59-250398

[51] Int. Cl.4 ........................................... F02D 21/10
[52] U.S. Cl. ..................................... 123/327; 123/333
[58] Field of Search ............. 123/332, 333, 493, 559, 123/327, 589

[56] References Cited

U.S. PATENT DOCUMENTS

| Re. 32,030 | 11/1985 | Yano et al. ............... | 123/327 |
| 3,486,594 | 12/1969 | Wren ........................ | 123/327 X |
| 3,665,905 | 5/1972 | Brille et al. .................. | 123/559 R |
| 3,690,305 | 9/1972 | Shimada et al. ............. | 123/325 |
| 4,146,000 | 3/1979 | Hattori et al. ............... | 123/589 X |
| 4,391,243 | 7/1983 | Bessho ........................ | 123/493 |
| 4,484,497 | 11/1984 | Hibino ........................ | 123/333 |
| 4,492,195 | 1/1985 | Takahashi et al. .......... | 123/339 |
| 4,494,505 | 1/1985 | Naramura .................... | 123/327 X |
| 4,526,144 | 7/1985 | Hasegawa et al. ........... | 123/327 X |

FOREIGN PATENT DOCUMENTS

| 56-23480 | 6/1981 | Japan . | |
| 57-19298 | 4/1982 | Japan . | |
| 57-97055 | 6/1982 | Japan . | |
| 144642 | 8/1983 | Japan .................... | 123/493 |

Primary Examiner—Willis R. Wolfe
Assistant Examiner—Eric R. Carlberg
Attorney, Agent, or Firm—Cushman, Darby & Cushman

[57] ABSTRACT

A deceleration control device of an engine comprising an intake passage which has a throttle valve therein. A bypass passage is branched from intake passage upstream of the throttle valve and is connected to the intake passage downstream of the throttle valve. A flow control valve is arranged in the bypass passage. At the time of deceleration, when the supply of fuel is cut, the flow control valve opens to increase the flow area of the bypass passage by a predetermined flow area.

12 Claims, 6 Drawing Sheets

DECELERATION CONTROL DEVICE OF AN INTERNAL COMBUSTION ENGINE

This is a of application Ser. No. 800,347, filed Nov. 21, 1985 now abandoned.

BACKGROUND OF THE INVENTION

1. Field of the Invention

The present invention relates to a deceleration control device of an internal combustion engine.

2. Description of the Related Art

In Japanese Unexamined Patent Application No. 59-142174, the present applicants proposed an engine in which a throttle valve is arranged in the intake passage of the engine and, in addition, a mechanical supercharger driven by the engine is arranged in the intake passage downstream of the throttle valve. A bypass passage is branched from the intake passage upstream of the throttle valve and is connected to the intake passage downstream of the supercharger. A vacuum operated valve is arranged in the bypass passage and opens when the engine is decelerated.

In such an engine, in which the mechanical supercharger is arranged in the intake passage downstream of the throttle valve, the volume of the intake passage downstream of the throttle valve inevitably increases. As a result, when the decelerating operation of the engine is started, and the engine speed then decreases to an idling speed, the level of vacuum in the intake passage downstream of the throttle valve becomes higher than the level of vacuum produced in the intake passage downstream of the throttle valve when a usual idling operation is carried out. That is, when the throttle valve closes in order to decelerate the engine, since the flow area of the intake passage is restricted by the throttle valve, the level of vacuum produced in the intake passage downstream of the throttle valve rapidly becomes high. At this time, an approximately fixed amount of air is continuously fed via the throttle valve into the intake passage downstream of the throttle valve. When the decelerating operation of the engine is started, and the engine speed then decreases, the amount of air fed into the engine cylinders per unit of time gradually decreases. Contrary to this, at this time, an approximately fixed amount of air is continuously fed via the throttle valve into the intake passage downstream of the throttle valve, as mentioned above. Consequently, as the engine speed decreases, the level of vacuum in the intake passage downstream of the throttle valve becomes gradually low and then is recovered to the level of vacuum in a usual idling operation state. As mentioned above, where the decelerating operation is carried out, the level of vacuum in the intake passage downstream of the throttle valve becomes excessively high immediately after the decelerating operation is started. Then, after a short period, the level of vacuum in the intake passage downstream of the throttle valve is recovered to the level of vacuum in a usual idling operation state.

As mentioned above, when the throttle valve is closed in order to decelerate the engine, an approximately fixed amount of air is fed via the throttle valve into the intake passage downstream of the throttle valve. However, this amount of air is small. Consequently, where the intake passage downstream of the throttle valve has a large volume, even if the engine speed decreases after the decelerating operation is started, the level of vacuum in the intake passage is not easily recovered to the level of vacuum in a usual idling operation state. Consequently, where the intake passage downstream of the throttle valve has a large volume, a long time must pass before the level of vacuum in the intake passage is recovered to the level of vacuum in a usual idling operating state. Therefore, where the decelerating operation is carried out and the engine speed rapidly decreases, the level of vacuum produced in the intake passage when the engine speed decreases to an idling speed becomes higher than the level of vacuum in a usual idling operating state. However, if a higher level of vacuum is produced in the intake passage when the engine speed decreases to an idling speed, the amount of air fed into the engine cylinders decreases. This results in a problem in that the engine will stall.

In order to solve this problem, in the engine proposed by the present applicants, when the decelerating operation is carried out, the vacuum operated valve is caused to open and, thus, the amount of air fed into the intake passage downstream of the throttle valve is caused to increase. As a result, the time period for recovering the level of vacuum in the intake passage is shortened so that the level of vacuum produced in the intake passage when the engine speed decreases to an idling speed becomes approximately equal to the level of vacuum in an ordinary idling operating state. In order to shorten the time period for recovering the level of vacuum as mentioned above, it is necessary to feed a relatively large amount of air into the intake passage from the bypass passage via the vacuum operated valve.

However, when the decelerating operation is carried out, if a larger amount of air is fed into the intake passage from the bypass passage, the amount of fuel fed into the intake passage must be increased accordingly. As a result, a problem occurs in that fuel consumption will increase.

SUMMARY OF THE INVENTION

An object of the present invention is to provide a deceleration control device of an engine capable of improving fuel consumption at the time of deceleration.

According to the present invention, there is provided a deceleration control device of an internal combustion engine having an intake passage which has a throttle valve therein, said device comprising: a bypass passage branched from the intake passage upstream of the throttle valve and connected to the intake, passage downstream of the throttle valve; valve means arranged in the bypass passage to control the flow area of the bypass passage; fuel supply means arranged in the intake passage; detecting means detecting a deceleration state of the engine and producing an output signal representing the decelerating state; fuel supply control means controlling the fuel supply means in response to the output signal of the detecting means for producing a fuel cut signal to cut the supply of fuel from the fuel supply means when the deceleration state is a predetermined deceleration state; and valve control means controlling the valve means in response to the fuel cut signal to increase the flow area of the bypass passage when the supply of fuel from the fuel supply means is cut.

The present invention may be more fully understood from the description of a preferred embodiment of the invention set forth below, together with the accompanying drawings.

DESCRIPTION OF A PREFERRED EMBODIMENT

Figure 1:
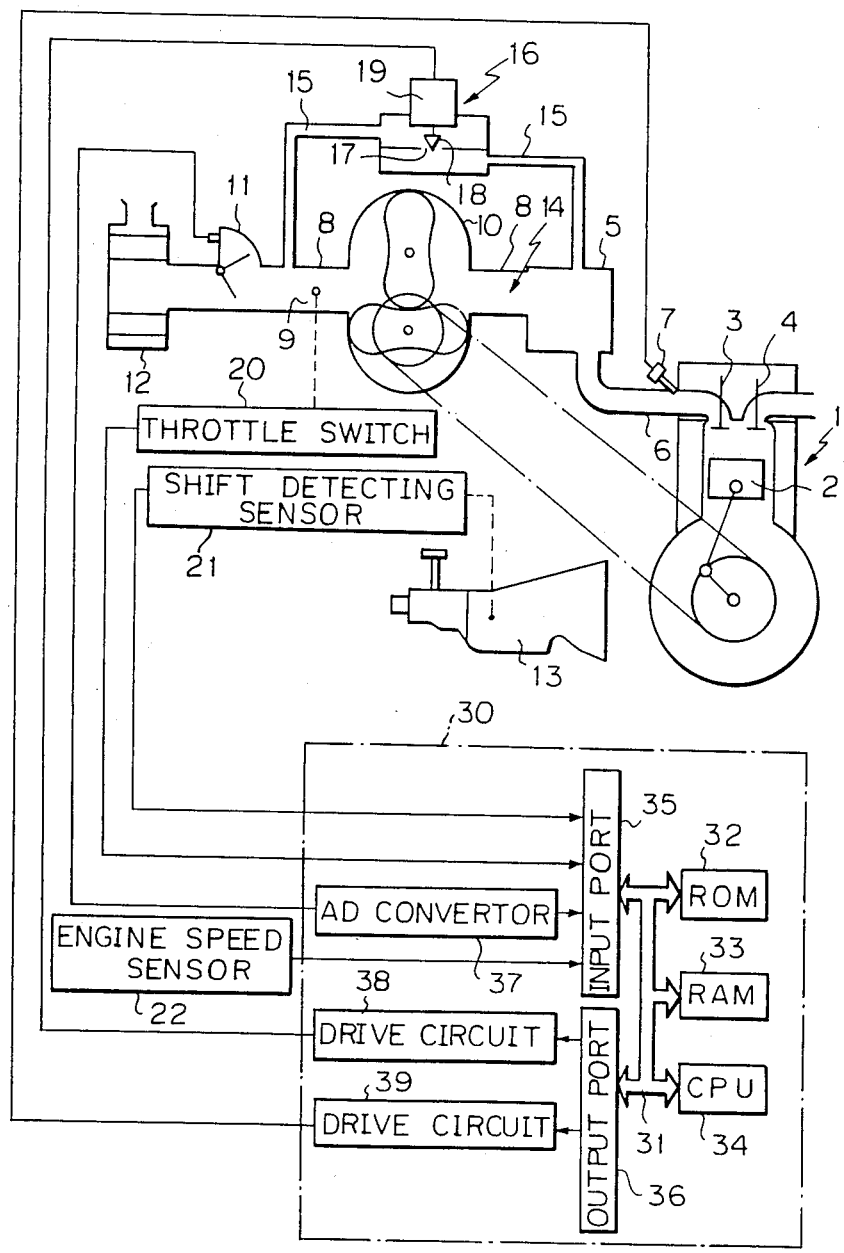
FIG. 1 is a schematically illustrated cross-sectional side view of an engine.

Referring to FIG. 1, reference numeral 1 designates an engine body, 2 a piston, 3 an intake valve, and 4 an exhaust valve; 5 designates a surge tank, 6 branch pipes, 7 fuel injectors, each mounted on the corresponding branch pipe, and 8 an intake duct; 9 designates a throttle valve arranged in the intake duct 8, 10 a mechanical supercharger driven by the engine and arranged in the intake duct 8 downstream of the throttle valve 9, and 11 an air flow meter arranged at the inlet of the intake duct 8; 12 an air cleaner, and 13 an automatic transmission connected to the engine body 1. The surge tank 5, the branch pipes 6 and the intake duct 8 form an intake passage 14. A bypass passage 15 is branched from the intake duct 8 upstream of the throttle valve 9 and is connected to the surge tank 5. A flow control valve 16 is arranged in the bypass passage 15. This flow control valve 16 comprises a valve port 17 formed in the bypass passage 15, a valve body 18 controlling the flow area of the valve port 17, and a stepper motor 19 for driving the valve body 18. The stepper motor 19 is connected to an electronic control unit 30. In addition, a throttle switch 20 is attached to the valve shaft of the throttle valve 9, and a shift detecting sensor 21 is arranged on the automatic transmission 13. The throttle switch 20 and the shift detecting sensor 21 are connected to the electronic control unit 30.

The electronic control unit 30 is constructed as a digital computer and comprises a read-only memory (ROM) 32, a random-access memory (RAM) 33, a microprocessor (CPU) 34, an input port 35 and an output port 36. The ROM 32, the RAM 33, the CPU 34, the input port 35, and the output port 36 are interconnected to each other via a bidirectional bus 31. The throttle switch 20, the shift detecting sensor 21 and an engine speed sensor 22 are connected to the input port 35. In addition, the air flow meter 11 is connected to the input port 35 via an AD converter 37. The output port 36 is connected to the stepper motor 19 and the fuel injectors 7 via corresponding drive circuits 38 and 39.

The air flow meter 11 produces an output voltage proportional to the amount of air fed into the engine cylinders. This output voltage is converted to a corresponding binary code in the AD converter 37 and then input to the CPU 34 via the input port 35. The throttle switch 20 is made ON when the throttle valve 9 is in the idling position, and the throttle switch 20 is made OFF when the throttle valve 9 opens. The ON-OFF signal of the throttle switch 20 is input to the CPU 34 via the input port 35. The shift detecting sensor 21 is a sensor which is able to detect whether the automatic transmission 13 is in neutral (hereinafter referred to as the N position) or in the drive range (hereinafter referred to as the D range). The output signal of the shift detecting sensor 21, which represents whether the automatic transmission 13 is in the N position or in the D range, is input to the CPU 34 via the input port 35. The engine speed sensor 22 produces output pulses at a frequency which is proportional to the engine speed. These output pulses are input to the CPU 34 via the input port 35.

In the CPU 34, the engine speed NE is calculated from the output pulses of the engine speed sensor 22. In addition, in the CPU 34, the amount of fuel to be injected is calculated from the engine speed NE and the output signal of the air flow meter 11, and fuel is injected from the fuel injectors 7 by an amount thus calculated. The position of the valve body 18 is determined by the step position of the stepper motor 19. The opening degree of the valve body 18, that is, the flow area of the valve port 17 increases as the numeral representing the step position of the stepper motor 19 becomes large. The present step position is stored in the RAM 33.

When the throttle valve 9 is in the idling position, and when the engine speed NE is lower than a predetermined speed, it is judged that the idling operation is carried out. At this time, the stepper motor 19 is driven so that the engine speed NE becomes equal to a predetermined idling speed stored in the ROM 32. That is, when the engine speed NE is lower than the predetermined idling speed, the stepper motor 19 is driven in a direction which causes the valve body 18 to open so that the amount of bypass air fed into the surge tank 5 from the bypass passage 15 is increased. When the engine speed NE is higher than the predetermined idling speed, the stepper motor 19 is driven in a direction which causes the valve body 18 to close so that the amount of the bypass air is decreased. As a result, the engine speed NE is controlled so that it becomes equal to the predetermined idling speed. When the throttle valve 9 opens, and thus the operating state of the engine is changed from the idling state to a state other than the idling state, the stepper motor 19 remains stationary. Consequently, the valve body 18 is maintained at a position immediately before the throttle valve 9 opens.

Figure 2:
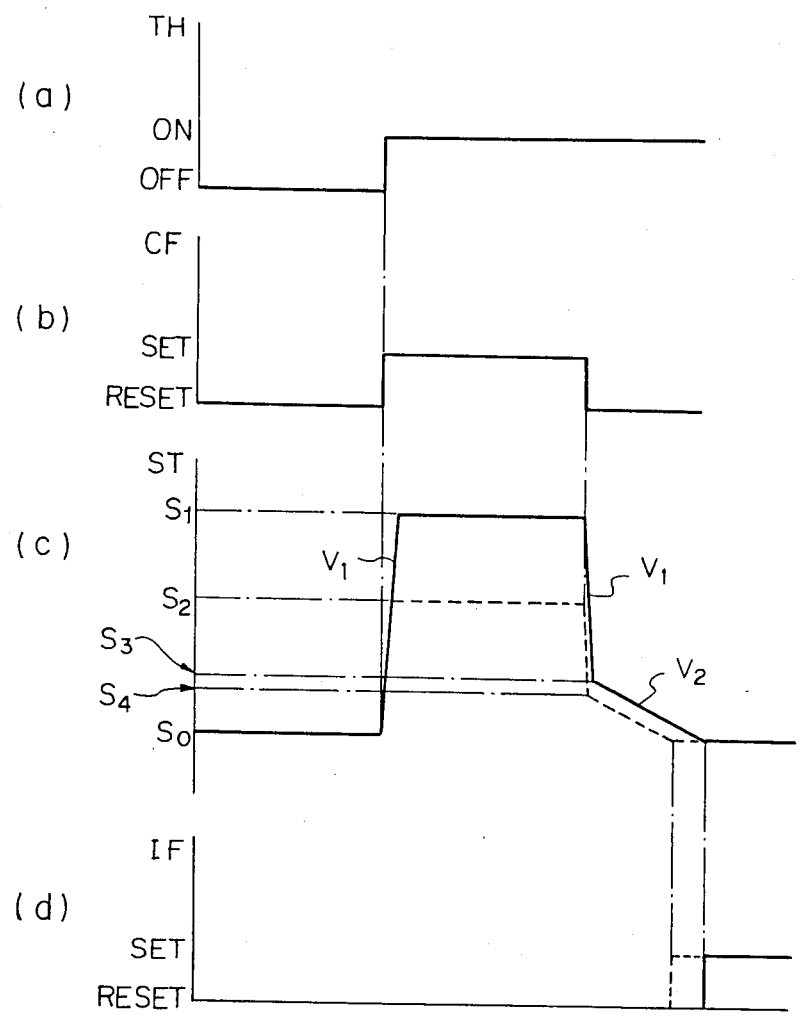
FIG. 2 is a time chart of the deceleration control according to the present invention.

FIG. 2 illustrates a time chart of the deceleration control according to the present invention. In FIG. 2(a), TH indicates an output signal of the throttle switch 20 and, in FIG. 2(b), CF indicates a cut flag CF which is set when the fuel supply is cut. In FIG. 2(c), ST indicates the step position of the stepper motor 19 and, in FIG. 2(d), IF indicates an ISC flag which is set when the idling speed control is carried out.

When the throttle switch 20 is in the OFF position as illustrated in FIG. 2(a), that is, the throttle valve 9 is open, the cut flag CF remains reset as illustrated in FIG. 2(b). Consequently, at this time, fuel is fed from the fuel injectors 7. In addition, at this time, the ISC flag IF remains reset as illustrated in FIG. 2(d), and thus the idling speed control is not carried out. At this time, as illustrated in FIG. 2(c), the step position ST of the stepper motor 19 is maintained at the step position $S_0$. As mentioned previously, this step position $S_0$ is a step position immediately before the throttle valve 9 opens.

When the throttle valve 9 closes in order to decelerate the engine, the throttle switch 20 is made ON as illustrated in FIG. 2(a). At this time, if the engine speed NE is higher than a predetermined cut speed, for example, 1600 r.p.m., the fuel supply is cut, and the cut flag CF is set. If the cut flag CF is set, the stepper motor 19 is rotated in a direction which causes the valve body 18 to open at a speed of $V_1$. That is, the step position ST increases as illustrated in FIG. 2(c). At this time, if the transmission 13 is in the N position, the step position ST increases from $S_0$ to $S_1$ as illustrated by the solid line in FIG. 2(c). Contrary to this, if the transmission 13 is in the D range, the step position ST increases from $S_0$ to $S_2$ as illustrated by the broken line in FIG. 2(c). Consequently, it will be understood that an increase in the opening degree of the valve body 18 at deceleration in the N position is larger than an increase in the opening degree of the valve body 18 at deceleration in the D range.

When the engine speed NE decreases below a predetermined return speed, for example, 1200 r.p.m., the supply of fuel from the fuel injection 7 is started, and the cut flag CF is reset. If the cut flag CF is reset, the stepper motor 19 is rotated in a direction which causes the valve body 18 to close. At this time, if the transmission 13 is in the N position, the valve body 18 closes at a speed of $V_1$ until the step position ST decreases from $S_1$ to $S_3$, and then the valve body 18 slowly closes at a speed of $V_2$ until the step position ST decreases to $S_0$, as illustrated by the solid line in FIG. 2(c). Contrary to this, if the transmission 13 is in the D range, the valve body 18 closes at a speed of $V_1$ until the step position ST decreases from $S_2$ to $S_4$, and then the valve body 18 slowly closes at a speed of $V_2$ until the step position ST decreases to $S_0$ as illustrated by the broken line in FIG. 2(c). When the stp position ST has decreased to $S_0$, the ISC flag IF is set as illustrated in FIG. 2(d) and thus the idling speed control is started.

As mentioned above, when the cut flag CF is set, the stepper motor 19 is rotated in order to increase the amount of bypass air. However, when the decelerating operation of the engine is started, if the engine speed NE is lower than the predetermined cut speed, for example, 1600 r.p.m., the fuel supply is not cut, that is, the cut flag CF remains reset. Consequently, at this time, the stepper motor 19 remains stationary and thus the operation for increasing the bypass air is not carried out.

Therefore, in the present invention, the amount of bypass air increases only when the supply of fuel is cut. If the amount of bypass air increases, the level of vacuum in the surge tank 5 becomes small and, as a result, the level of vacuum produced in the surge tank 5 when the engine speed NE decreases to an idling speed becomes equal to the level of vacuum in a usual idling operation state. Consequently, it is possible to prevent the engine from being stalled.

Contrary to this, when the decelerating operation is started, if the engine speed NE is low, the amount of bypass air does not increase. At this time, since the engine speed NE is low, the level of vacuum in the surge tank 5 does not become so high. Consequently, at this time, even if the amount of bypass air does not increase, the level of vacuum produced in the surge tank 5 when the engine speed NE decreases to an idling speed becomes equal to the level of vacuum in usual idling position state. Consequently, at this time, there is no danger that the engine will stall.

As mentioned above, according to the present invention, the amount of air increases only when the supply of fuel is cut. Consequently, if the amount of air increases in order to prevent the engine from being stalled, since the supply of fuel is cut, the amount of fuel fed into the engine cylinders does not increase. Therefore, it is possible to reduce fuel consumption.

In addition, in the present invention, the opening degree of the valve body 18 is controlled in accordance with the range of the transmission 13. That is, when the decelerating operation of the engine is started, if the transmission 13 is in the N position, the engine speed NE rapidly decreases. Consequently, at this time, if the amount of bypass air is small, the level of vacuum produced in the surge tank 5 when the engine speed NE decreases to an idling speed becomes higher than the level of vacuum in a usual idling operation state. Consequently, if the transmission 13 is in the N position, it is necessary to feed a large amount of bypass air into the surge tank 5.

Contrary to this, when the decelerating operation is started, if the transmission 13 is in the D range, a long time must pass before the engine speed NE decreases to an idling speed. Consequently, at this time, even if the amount of bypass air is small, the level of vacuum produced in the surge tank 5 when the engine speed NE decreased to an idling speed becomes equal to the level of vacuum in a usual idling operation state. That is, in the present invention, by reducing the amount of bypass air fed into the surge tank 5 when the transmission 13 is in the D range as compared with the case where the transmission 13 is in the N position, it is possible to further reduce the fuel consumption while preventing the engine from being stalled.

In addition, in the present invention, as illustrated in FIG. 2(c), when the cut flag CF is reset, initially, the valve body 18 rapidly closes at a high speed $V_1$ and then slowly closes at a low speed $V_2$. This is because, when the cut flag CF is reset, if the step position ST abruptly decreases from $S_1$ or $S_2$ to $S_0$, the amount of air fed into the engine cylinders decreases below an amount which is required for obtaining a stable combustion of the engine, and thus there is a danger that the engine will be stalled. The amount of air required for obtaining a stable combustion is reduced as the engine speed NE is reduced. Consequently, in the present invention, in order to obtain a stable combustion when the supply of fuel is started, the amount of bypass air is gradually reduced by slowly closing the valve body 18 at a low speed $V_2$.

Figure 3:
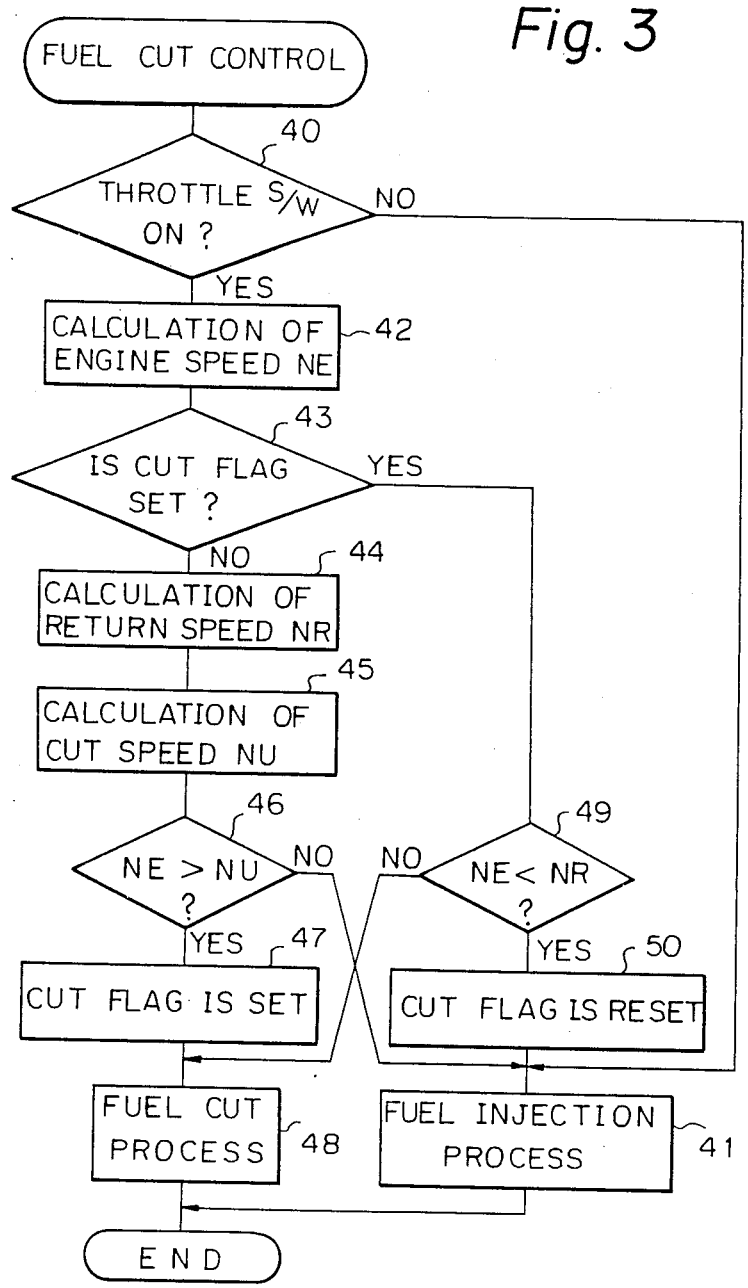
FIG. 3 is a flow chart for executing the fuel cut control.

FIGS. 3 through 7 are flow charts for executing the control illustrated in the time chart of FIG. 2. FIG. 3 is the flow chart for executing the fuel cut control. Referring to FIG. 3, initially, in step 40, it is determined whether the throttle switch 20 is in the ON state. If the throttle switch 30 is in the OFF state, the routine jumps to step 41, and fuel is injected from the fuel injectors 7. If the throttle switch 20 is in the ON state, the routine goes to step 42, and the engine speed NE is calculated from the output pulses of the engine speed sensor 22. Then, in step 43, it is determined whether the cut flag CF is set. If the cut flag CF is not set, the routine goes to step 44, and the return speed NR is calculated. This return speed NR represents an engine speed at which the supply of fuel is started after the supply of fuel is cut at the time of deceleration. The return speed NR is determined by, for example, the range of the transmission 13. This return speed NR is stored in the ROM 32 in the form of a map and is, for example, 1200 r.p.m. Then, in step 45, the cut speed NU is calculated. This cut speed NU represents an engine speed determining whether the supply of fuel is cut. This cut speed NU is obtained by adding a fixed speed to the return speed NU. Namely, if the fixed speed is 400 r.p.m. and the return speed NR is 1200 r.p.m., the cut speed NU becomes 1600 r.p.m. Then, in step 46, it is determined whether the engine speed NE is higher than the cut speed NU. If NE≦NU, the routine jumps to step 41. Consequently, at this time, the supply of fuel is not cut. If NE>NU, the routine goes to step 47, and the cut flag CF is set. Then, in step 48, the supply of fuel is cut.

If the cut flag CF is set, the routine jumps from step 43 to step 49, and it is determined whether the engine speed NE is lower than the return speed NR. If NE≧NR, the routine goes to step 48, and the supply of fuel remains cut. If NE<NR, the routine goes to step 50, and the cut flag is reset. Then the routine goes to step 41, and the supply of fuel is started.

Figure 4:
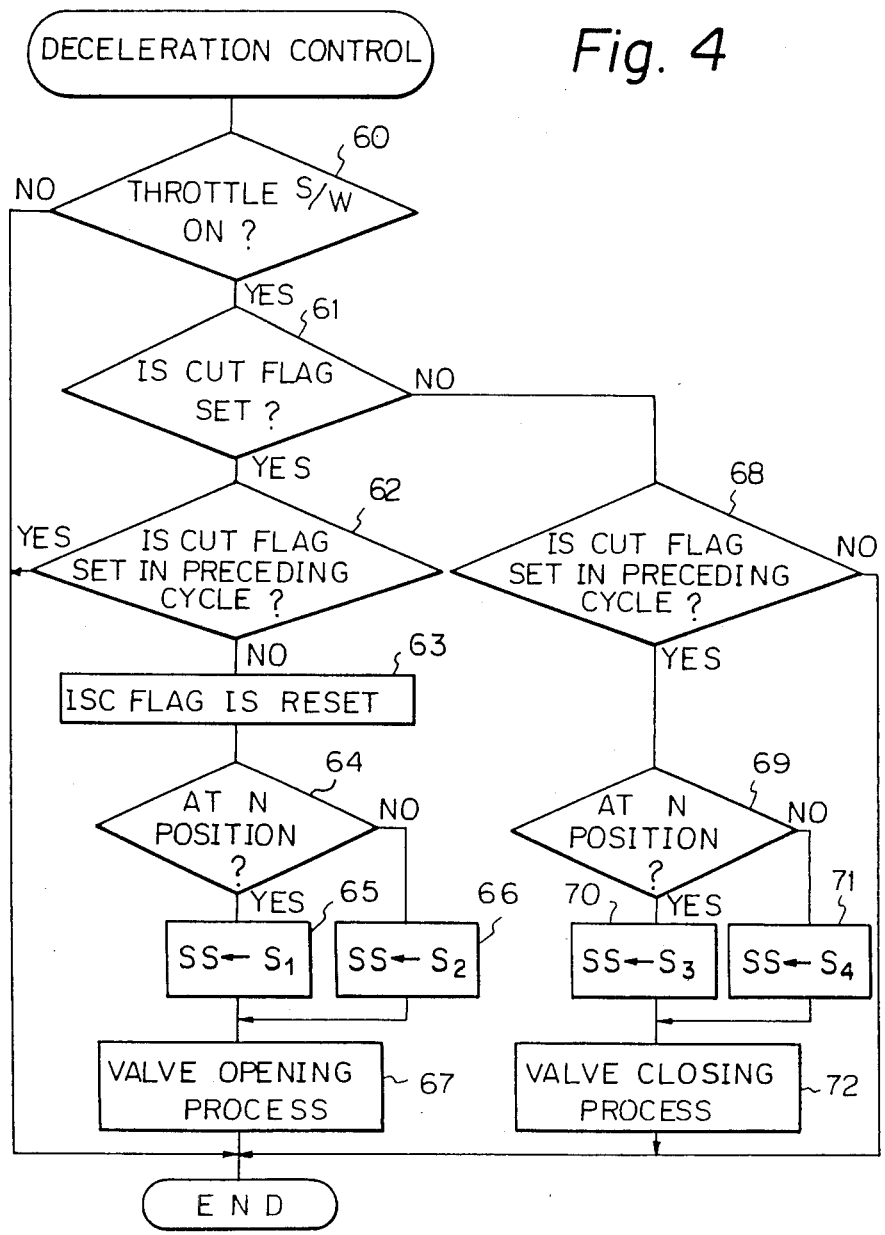
FIG. 4 is a flow chart for executing the deceleration control.

FIG. 4 is the flow chart for executing the decelerating control. Referring to FIG. 4, in step 60, it is determined whether the throttle switch 20 is in the ON state. If the throttle switch 60 is in the OFF state, the processing cycle is completed. If the throttle switch 60 is in the ON state, the routine goes to step 61, and it is determined whether the cut flag CF is set. If the cut flag CF is set, the routine goes to step 62, and it is determined whether the cut flag CF is set in the preceding processing cycle. If the cut flag CF is set in the preceding processing cycle, the processing cycle is completed. If the cut flag CF is not set in the preceding processing cycle, that is, when the cut flag CF is just set, the routine goes to step 63, and the ISC flag IF is reset. Then, in step 64, it is determined whether the transmission 13 is in the N position or the D range. If the transmission 13 is in the N position, $S_1$ is put into the desired step position SS in step 65. If the transmission 13 is in the D range, $S_2$ is put into the desired step position SS in step 66. Then, in step 67, the valve opening process of the flow control valve 16 is executed.

Figure 5:
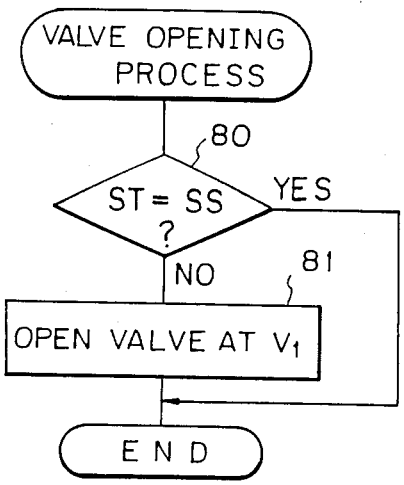
FIG. 5 is a flow chart for executing the valve opening process.

FIG. 5 is the flow chart executing this valve opening process. Referring to FIG. 5, in step 80, it is determined whether the step position ST is equal to the desired step position SS. If the step position ST is not equal to the desired step position SS, the routine goes to step 81, and the stepper motor 19 is rotated so that the valve body 18 opens at a speed of $V_1$. When the step position ST becomes equal to the desired step position SS, the rotation of the stepper motor 19 is stopped. Therefore, when the cut flag CF is set, the step position ST increases to $S_1$ or $S_2$.

Turning to FIG. 4, if it is determined in step 61 that the cut flag CF is not set, the routine goes to step 68. In step 68, it is determined whether the cut flag CF is set in the preceding process cycle. If the cut flag CF is not set in the preceding process cycle, the process cycle is completed. If the cut flag CF is set in the preceding process cycle, that is, when the cut flag CF is just reset, the routine goes to step 69, and it is determined whether the transmission 13 is in the N position or in the D range. If the transmission 13 is in the N position, the routine goes to step 70, and $S_3$ is put into the desired step position SS. If the transmission 13 is in the D range, the routine goes to step 71, and $S_4$ is put into the desired step position SS. Then, in step 72, the valve closing process is executed.

Figure 6:
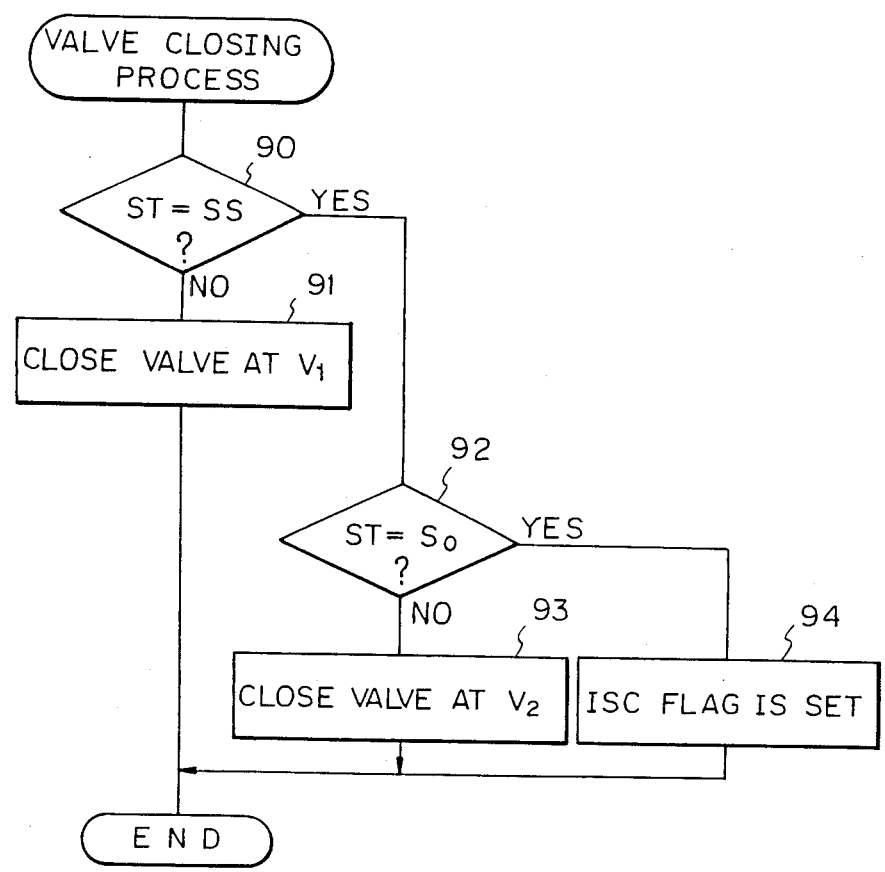
FIG. 6 is a flow chart for executing the valve closing process.

FIG. 6 is the flow chart for executing the valve closing process. Referring to FIG. 6, in step 90, it is determined whether the step position ST is equal to the desired step position SS. If the step position ST is not equal to the desired step position SS, the routine goes to step 91, and the stepper motor 19 is driven so that the valve body 18 closes at a speed of $V_1$. If the step position ST becomes equal to the desired step position SS, the routine goes to step 92, and it is determined whether the step position ST is equal to the initial step position $S_0$. If the step position ST is not equal to the initial step position $S_0$, the routine goes to step 93, and the stepper motor 19 is slowly rotated so that the valve body 18 slowly closes at a speed of $V_2$. When the step position ST becomes equal to the initial step position $S_0$, the routine goes to step 94, and the ISC flag IF is set. Consequently, when the cut flag CF is reset, the valve body 18 initially closes at a high speed $V_1$ and then slowly closes at a low speed $V_2$.

Figure 7:
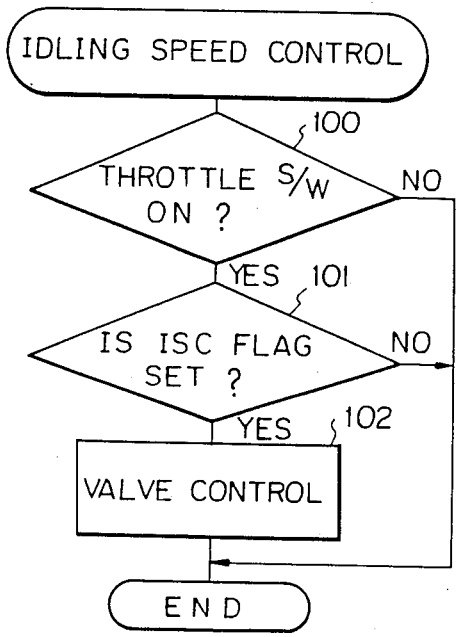
FIG. 7 is a flow chart for executing the idle speed control.

FIG. 7 is the flow chart for executing the idling speed control. Referring to FIG. 7, in step 100, it is determined whether the throttle switch 20 is in the ON state. If the throttle switch 20 is in the ON state, the routined goes to step 101, and it is determined whether the ISC flag IF is set. If the ISC flag IF is set, the routine goes to step 102, and the idling speed control is carried out. That is, the stepper motor 19 is controlled so that the engine speed NE becomes equal to a predetermined idling speed.

In the embodiment illustrated in FIG. 1, the amount of air is controlled by the stepper motor 19. However, in place of the stepper motor 19, a vacuum operated diaphragm apparatus may be used for controlling the position of the valve body 18. In this case, the vacuum chamber of the diaphragm apparatus is connected to the surge tank 5 via a vacuum conduit, and an electromagnetic flow control valve is arranged in the vacuum conduit. The duty cycle of control pulses applied to the electromagnetic flow control valve is controlled so that the valve body 18 opens to a desired position as illustrated in FIG. 2(c) when the decelerating operation is carried out.

While the invention has been described by reference to a specific embodiment chosen for purposes of illustration, it should be apparent that numerous modifications could be made thereto by those skilled in the art without departing from the basic concept and scope of the invention.

We claim:

1. A deceleration control device of an internal combustion engine having an intake passage which has a throttle valve therein, said engine including a automatic transmission with at least a neutral and a drive position, said device comprising:
   a bypass passage branched from a location in the intake passing upstream of the throttle valve to a location in the intake passage downstream of the throttle valve;
   valve means arranged in said bypass passage for controlling a flow area of said bypass passage;
   means for supplying fuel, arranged in said intake passage;
   detecting means for detecting a deceleration state of the engine and producing an output signal representing said deceleration state;
   fuel supply control means for controlling said fuel supply means in response to the output signal of said detecting means to produce a fuel cut signal to cut the supply of fuel from said fuel supply means when said deceleration state is a predetermined deceleration state; and
   valve control means for controlling said valve means in response to said fuel cut signal to increase the flow area of said bypass passage when the supply of fuel from said bypass means is cut, wherein said valve means opens to increase the flow area of said bypass passage by a predetermined flow area when said fuel cut signal is produced, and said valve means closes to reduce the flow area of said bypass passage when the production of said fuel cut signal is stopped, said predetermined flow area being further changed in accordance with a shift range of said automatic transmission and being larger in said neutral position than in said drive position.

2. A device according to claim 1, wherein said detecting means comprises engine speed sensor means for detecting the engine speed, and a throttle switch means for detecting that the throttle valve is in an idling position, said fuel cut signal being produced when the throttle valve is in the idling position and when the engine speed is higher than a predetermined cut speed, the production of said fuel cut signal being stopped when the throttle valve is in the idling position and when the engine speed decreases below a predetermined return speed.

3. A device according to claim 2, further comprising a digital computer having a ROM, said return speed being stored in said ROM, said cut speed being calculated by adding a fixed speed to said return speed.

4. A device according to claim 1, wherein the flow area of aid bypass passage is maintained constant during the time said fuel cut signal is produced.

5. A device according to claim 1, wherein said engine comprises an automatic transmission, said valve means closes at said first speed to an opening degree which is determined by a shift range of said automatic transmission.

6. A device according to claim 5, wherein the shift range of said automatic transmission comprises an N position and a D range, said opening degree in said N position being larger than said opening degree in said D range.

7. A device according to claim 1, further comprising a throttle switch which produces an output signal indicating that the throttle valve is in an idling position, an engine speed sensor which produces an output signal representing the engine speed, and idling speed control means which controls said valve means in response to the output signals of said throttle switch and said engine speed sensor to maintain the engine speed at a predetermined idling speed when the throttle valve is in the idling position.

8. A device according to claim 7, wherein said idling speed control means stops the control of said valve means when said fuel cut signal is produced.

9. A device according to claim 8, wherein said idling speed control means starts the control of said valve means when the production of said fuel cut signal is stopped.

10. A device according to claim 1, further comprising a mechanical supercharger driven by the engine and arranged in the intake passage downstream of the throttle valve.

11. A device according to claim 1, wherein said valve means comprises a valve port formed in said bypass passage, a valve body which cooperates with said valve port, and a stepper motor connected to said valve body for driving said valve body.

12. A device as in claim 1 wherein said valve control means includes means for initially closing said valve means at a first speed and subsequently closing said valve means at a second speed which is lower than said first speed.

* * * * *